(12) United States Patent
Wang et al.

(10) Patent No.: US 12,219,235 B2
(45) Date of Patent: Feb. 4, 2025

(54) ELECTRONIC DEVICE AND CAMERA MODULE

(71) Applicant: Honor Device Co., Ltd., Shenzhen (CN)

(72) Inventors: Feng Wang, Shenzhen (CN); Yukun Yang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/996,299

(22) PCT Filed: May 9, 2022

(86) PCT No.: PCT/CN2022/091799
§ 371 (c)(1),
(2) Date: Oct. 14, 2022

(87) PCT Pub. No.: WO2023/005333
PCT Pub. Date: Feb. 2, 2023

(65) Prior Publication Data
US 2024/0223879 A1  Jul. 4, 2024

(30) Foreign Application Priority Data

Jul. 26, 2021  (CN) .......................... 202110846782.0

(51) Int. Cl.
*H04N 23/57* (2023.01)
*H04N 23/80* (2023.01)

(52) U.S. Cl.
CPC ............ *H04N 23/57* (2023.01); *H04N 23/80* (2023.01)

(58) Field of Classification Search
CPC .............................. H04N 23/57; H04N 23/80
See application file for complete search history.

(56) References Cited

U.S. PATENT DOCUMENTS

| | | | |
|---|---|---|---|
| 9,924,096 B2 * | 3/2018 | Moon | G02B 27/646 |
| 10,779,714 B2 | 9/2020 | Mishima | |
| 2010/0053350 A1 * | 3/2010 | Miyauchi | H04N 23/67 348/222.1 |
| 2013/0329069 A1 * | 12/2013 | Kurashige | H04N 5/907 348/220.1 |
| 2016/0198077 A1 * | 7/2016 | Kuwata | H04N 23/80 348/207.1 |

FOREIGN PATENT DOCUMENTS

| | | |
|---|---|---|
| CN | 205195783 U | 4/2016 |
| CN | 205666992 U | 10/2016 |
| CN | 107005625 A | 8/2017 |

(Continued)

*Primary Examiner* — Amy R Hsu
(74) *Attorney, Agent, or Firm* — Slater Matsil, LLP

(57) ABSTRACT

An electronic device and a camera module are provided. An image signal processor integrated circuit and a first switch are disposed in the camera module, and the first switch can implement a single pole double throw function between a camera and two paths. In this way, through switching performed by using the first switch, image data acquired by the camera may be directly transmitted to a processor through a first path; or the image data acquired by the camera is processed by the image signal processor integrated circuit in a second path, and processed image data is transmitted to the processor.

20 Claims, 9 Drawing Sheets

(56) References Cited

FOREIGN PATENT DOCUMENTS

| | | | |
|---|---|---|---|
| CN | 108718372 | A | 10/2018 |
| CN | 109068945 | A | 12/2018 |
| CN | 208344076 | U | 1/2019 |
| CN | 110383295 | A | 10/2019 |
| CN | 212303018 | U | 1/2021 |
| CN | 213211043 | U | 5/2021 |
| JP | 2002125141 | A | 4/2002 |

* cited by examiner

ELECTRONIC DEVICE AND CAMERA MODULE

CROSS-REFERENCE TO RELATED APPLICATIONS

This application is a National Stage of International Application No. PCT/CN2022/091799, filed on May 9, 2022, which claims priority to Chinese Patent Application No. 202110846782.0, filed on Jul. 26, 2021, both of which are hereby incorporated by reference in their entireties.

TECHNICAL FIELD

Embodiments of this application relate to the field of terminal technologies, and in particular, to an electronic device and a camera module.

BACKGROUND

With the development of terminal technologies, cameras are increasingly applied in electronic devices. An electronic device can process image or video data acquired by a camera, to implement display, storage, and the like of an image or a video.

When the electronic device processes the image or video data acquired by the camera, a preprocessing chip may be added to a main board of the electronic device to optimize the image or video data through the preprocessing chip.

However, the manner in which the preprocessing chip is disposed on the main board of the electronic device results in a relatively large area of the main board and relatively high costs.

SUMMARY

Embodiments of this application provide an electronic device and a camera module to reduce an area occupied by a preprocessing chip on a main board and reduce costs.

According to a first aspect, an embodiment of this application provides an electronic device, including a main board and a camera module. The camera module includes a camera, an image signal processor integrated circuit, and a first switch. The main board is provided with a processor. The camera is configured to acquire image data. The image signal processor integrated circuit is configured to process the image data acquired by the camera. The first switch is a switch for implementing a single pole double throw function and is specifically configured to implement switching of the camera to a first path or a second path, where the first path is a path through which the image data acquired by the camera is transmitted to the processor, and the second path is a path through which the image data acquired by the camera is processed by the image signal processor integrated circuit and processed image data is transmitted to the processor. The processor is configured to process the data from the first path or the data from the second path.

In this embodiment of this application, the image signal processor integrated circuit and the first switch are disposed in the camera module, and the first switch can implement the single pole double throw function between the camera and the two paths. In this way, through switching performed by using the first switch, the image data acquired by the camera may be directly transmitted to the processor through the first path, or the image data acquired by the camera is processed by the image signal processor integrated circuit in the second path and processed image data is transmitted to the processor. Because process complexity of the camera module is low, costs required for arranging the image signal processor integrated circuit and the first switch in the camera module are relatively low. Therefore, costs of the electronic device can be reduced. For example, the camera module may include approximately six layers of plates, there are a relatively small quantity of devices at each layer, and a circuit layout is relatively simple. In addition, there may usually be a vacant region in the camera module. The image signal processor integrated circuit and the first switch are disposed in the camera module, so that a process for manufacturing the camera module is not excessively difficult. In addition, in a specific implementation, the image signal processor integrated circuit and the first switch may alternatively be disposed in the vacant region in the camera module or may be integrated in the camera of the camera module. In this way, a quantity of devices can be increased without increasing an area of the camera module.

In a possible design, the processor receives the data from the first path or the data from the second path through a same interface. In this way, interface occupancy of the processor can be reduced.

In a possible design, the camera module further includes a second switch. The second switch is a switch for implementing a single pole double throw function and is specifically configured to implement switching of the processor to the first path or the second path in the camera module. A movable terminal of the first switch is connected to the camera, one fixed terminal of the first switch is connected to one end of the first path, and the other fixed terminal of the first switch is connected to one end of the second path. A movable terminal of the second switch is connected to the processor, one fixed terminal of the second switch is connected to the other end of the first path, and the other fixed terminal of the second switch is connected to the other end of the second path. The first switch and the second switch are configured to: establish continuity of the first path in a circuit and break continuity of the second path in the circuit when the image data acquired by the camera is to be transmitted through the first path; or establish continuity of the second path in the circuit and break continuity of the first path in the circuit when the image data acquired by the camera is to be transmitted through the second path. In this way, radiation generated when the first path or the second path is disconnected from the circuit can be reduced.

In a possible design, an anti-interference module is provided in the first path and/or the second path of the camera module, and an output end of the first path and an output end of the second path are connected to each other in the camera module. In this way, a quantity of switches can be reduced, thereby further reducing costs.

In a possible design, the main board further includes a third switch. The third switch is a switch for implementing a single pole double throw function and is specifically configured to implement switching of the processor to the first path or the second path in the main board. A movable terminal of the first switch is connected to the camera, one fixed terminal of the first switch is connected to one end of the first path, and the other fixed terminal of the first switch is connected to one end of the second path. Both the first path and the second path are connected to the main board through respective routes. A movable terminal of the third switch is connected to the processor, one fixed terminal of the third switch is connected to one end that is of the first path and that is connected to the main board, and the other fixed terminal of the third switch is connected to one end that is of the second path and that is connected to the main board.

The first switch and the third switch are configured to: establish continuity of the first path in a circuit and break continuity of the second path in the circuit when the image data acquired by the camera is to be transmitted through the first path; or establish continuity of the second path in the circuit and break continuity of the first path in the circuit when the image data acquired by the camera is to be transmitted through the second path. In this way, radiation generated when the first path or the second path is disconnected from the circuit can be reduced.

In a possible design, the processor respectively receives the data from the first path and the data from the second path through two interfaces. In this way, a quantity of switches can be reduced, thereby further reducing costs.

In a possible design, when the camera module is disposed in the electronic device, a metal shield is provided around the camera module. In this way, radiation or interference of the camera module on other devices of the electronic device can be reduced.

In a possible design, the camera module is connected to the main board via a flexible printed circuit FPC, a board-to-board connector BTB is provided in each of the camera module and the main board, and the BTB is configured to connect the FPC.

The first path may correspond to a path 1 or a path 3 in specific embodiments, and the second path may correspond to a path 2 or a path 4 in the specific embodiments.

The first switch may correspond to a first switch and a fourth switch in the specific embodiments.

According to a second aspect, an embodiment of this application provides a camera module. The camera module includes a camera, an image signal processor integrated circuit, and a first switch. The camera is configured to acquire image data. The image signal processor integrated circuit is configured to process the image data acquired by the camera. The first switch is a switch for implementing a single pole double throw function and is specifically configured to implement switching of the camera to a first path or a second path, where the first path is a path through which the image data acquired by the camera is transmitted to a processor in a main board, and the second path is a path through which the image data acquired by the camera is processed by the image signal processor integrated circuit and processed image data is transmitted to the processor.

In a possible design, the camera module further includes a second switch. The second switch is a switch for implementing a single pole double throw function and is specifically configured to implement switching of the processor to the first path or the second path in the camera module. A movable terminal of the first switch is connected to the camera, one fixed terminal of the first switch is connected to one end of the first path, and the other fixed terminal of the first switch is connected to one end of the second path. A movable terminal of the second switch is connected to the processor, one fixed terminal of the second switch is connected to the other end of the first path, and the other fixed terminal of the second switch is connected to the other end of the second path. The first switch and the second switch are configured to: establish continuity of the first path in a circuit and break continuity of the second path in the circuit when the image data acquired by the camera is to be transmitted through the first path; or establish continuity of the second path in the circuit and break continuity of the first path in the circuit when the image data acquired by the camera is to be transmitted through the second path.

In a possible design, an anti-interference module is provided in the first path and/or the second path of the camera module, and an output end of the first path and an output end of the second path are connected to each other in the camera module.

In a possible design, when the camera module is disposed in the electronic device, a metal shield is provided around the camera module.

Effects in the second aspect and the possible designs of the second aspect are similar to those in the first aspect and the possible designs of the second aspect, and details are not described herein again.

DETAILED DESCRIPTION OF ILLUSTRATIVE EMBODIMENTS

The term "a plurality of" in this specification means two or more. The term "and/or" in this specification describes only an association relationship for describing associated objects and represents that three relationships may exist. For example, A and/or B may represent the following three cases: A alone, both A and B, and B alone. In addition, the character "/" in this specification generally indicates that there is an "or" relationship between associated objects; and in a formula, the character "/" indicates that there is a "division" relationship between associated objects.

It can be understood that numbers in the embodiments of this application are merely used for differentiation for ease of description, and are not intended to limit the scope of the embodiments of this application.

It can be understood that, in the embodiments of this application, sequence numbers of the foregoing processes do not mean an execution sequence. The execution sequence of the processes should be determined based on functions and internal logic of the processes, and should not constitute any limitation on the implementation processes in the embodiments of this application.

With the development of terminal technologies, functional requirements of users for electronic devices are becoming increasingly diversified. To satisfy shooting requirements of the users, a relatively large quantity of electronic devices support a shooting function. In addition, with the improvement of shooting capabilities of electronic devices, the electronic devices have become an important tool for people to shoot photographs or videos.

During shooting, a user may trigger a shooting or recording function of an electronic device. The electronic device acquires image or video data by using a camera and further performs image or video optimization by using a preprocessing chip. For example, the electronic device may perform an optimization operation such as light filling, beautifying, or deburring on the image or video data by using the preprocessing chip. The preprocessing chip includes, for example, an image signal processor (image signal processor, ISP) integrated circuit (integrated circuit, IC).

In a possible implementation, the preprocessing chip is disposed in a main board (main board) of the electronic device, and the camera is disposed in a camera module (camera module). Image or video data acquired in the camera module may be transmitted to the preprocessing chip in the main board. The preprocessing chip further processes the image or video data.

Figure 1:
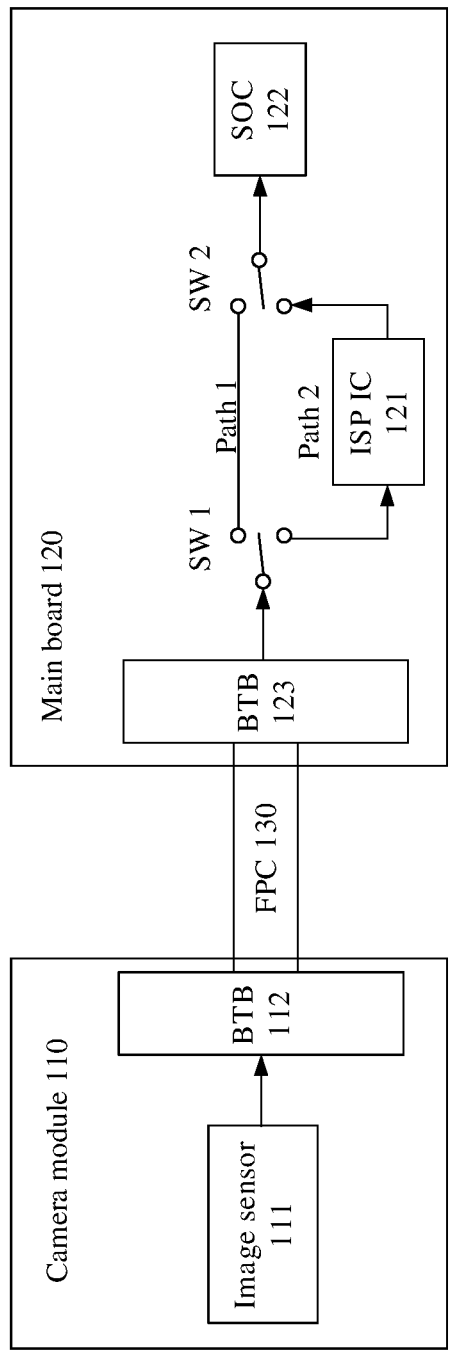
FIG. 1 is a schematic diagram of a structure in which a camera module is connected to a main board according to a possible implementation.

For example, FIG. 1 is a schematic diagram of a structure in which a camera module is connected to a main board.

As shown in FIG. 1, the camera module 110 is connected to the main board 120 via a flexible printed circuit (flexible printed circuit, FPC) 130. The camera module 110 includes an image sensor (image sensor) 11 and a board-to-board connector (board to board connectors, BTB) 112, and the image sensor may also be referred to as a camera. The main board 120 includes an ISP IC 121, a system on chip (system on chip, SOC) 122, a BTB 123, a switch SW 1, and a switch SW 2.

Two ends of the FPC 130 may be respectively inserted into the BTB 112 and the BTB 123. The SW 1 and the SW 2 each may be a single pole double throw switch. After image or video data acquired by the image sensor 111 is transmitted to the main board through the FPC 130, based on selection of the SW 1 and the SW 2, the image or video data may be directly transmitted to the SOC 122 through a path 1; or the image or video data may be processed by the ISP IC 121 in a path 2 and then processed image or video data may be transmitted to the SOC 122.

For example, if an electronic device performs image preview, video recording without beautification, or other steps, the electronic device may control the SW 1 and SW 2 to enable the path 1 to be connected, so that the image or video data acquired by the image sensor 111 is transmitted to the main board through the FPC 130, and then directly transmitted to the SOC 122 through the path 1. If the electronic device performs shooting, video recording with beautification, or other steps, the electronic device may control the SW 1 and the SW 2 to enable the path 2 to be connected, so that the image or video data acquired by the image sensor 111 is transmitted to the main board through the FPC 130 and processed by using the ISP IC 121 in the path 2, and then processed image or video data is transmitted to the SOC 122.

However, in the electronic device, process complexity of the main board is usually relatively high, and costs of the main board are also relatively high. For example, the main board may include approximately twelve layers of plates, there are a relatively large quantity of devices at each layer, and a circuit layout is relatively complex. The ISP IC, the SW 1, and the SW 2 are disposed in the main board. This not only increases an area of the main board and costs of the main board, but also increases circuit complexity of the main board, putting forward a higher requirement on a manufacturing process of the main board. As a result, the costs of the main board are further increased.

Based on this, in this embodiment of this application, the ISP IC is disposed in the camera module, and some or both of the SW 1 and the SW 2 are also disposed in the camera module. Process complexity of the camera module is low, costs of the camera module are relatively low. For example, the camera module may include approximately six layers of plates, there are a relatively small quantity of devices at each layer, and a circuit layout is relatively simple. In addition, there may usually be a vacant region in the camera module. Therefore, a manufacturing process of the camera module is not excessively difficult when the ISP IC is disposed in the camera module and some or both of the SW 1 and the SW 2 are also disposed in the camera module. In addition, in a specific implementation, the ISP IC, the SW 1, and/or the SW 2 may alternatively be disposed in the vacant region of the camera module. In this way, a quantity of devices can be increased without increasing an area of the camera module.

Therefore, compared with the implementation in which the ISP IC, the SW 1, and the SW 2 are disposed in the main board, the implementation in which the ISP IC and the SW 1 and/or the SW 2 are disposed in the camera module can reduce costs and reduce an area of the main board. In addition, by making the ISP IC and the switch devices integrated in the camera module, decoupling between the camera module and the main board can be implemented. In this way, the camera module can be applied to a universal main board, and main boards of a same type can be compatible with an ordinary camera module and a camera module with a preprocessing chip switching path, thereby improving universality of the main board.

Further, during assembly of the electronic device, a metal shield may be added around the camera module, so that a probability that a signal acquired by the camera is interfered with can be reduced. The metal shield may be a closed region defined by metal. For example, the metal shield around the camera module may be a metal sheet disposed around the camera module. It can be understood that the closed region defined by the metal may be similar to an uncapped region of a fence, or may be a fully closed region. This is not specifically limited in this embodiment of this application.

Figure 2:
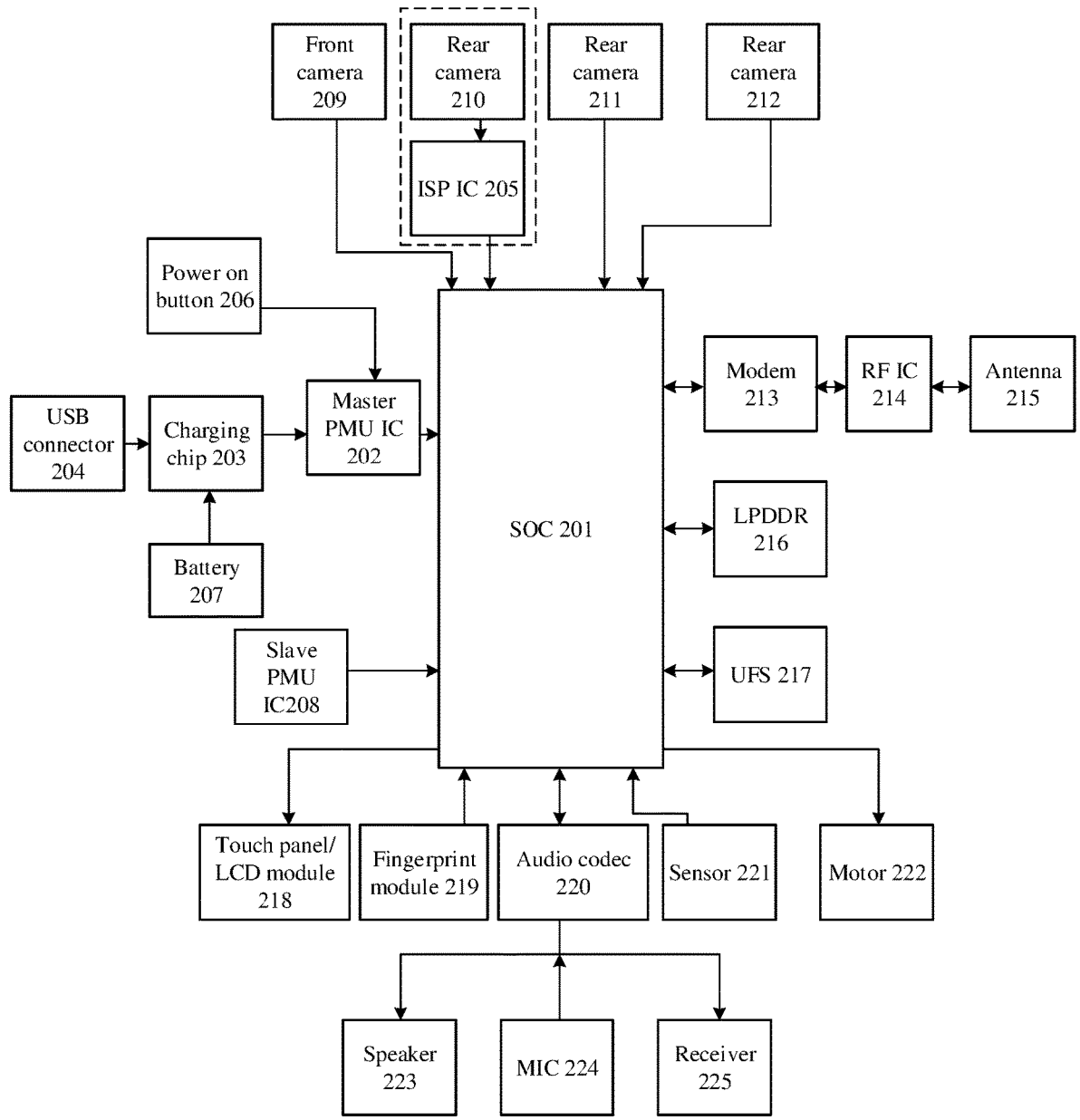
FIG. 2 is a schematic diagram of a structure of an electronic device according to an embodiment of this application.

For example, FIG. 2 is a schematic diagram of a structure of an electronic device according to an embodiment of this application.

As shown in FIG. 2, the electronic device 200 may include a system on chip (system on chip, SOC) 201, a master power management unit (master power management unit, master PMU) IC 202, a charging chip 203, a universal serial bus (universal serial bus, USB) connector (connector) 204, a power on button (power on key) 206, a battery (battery) 207, a slave PMU IC (slave PMU IC) 208, a front camera (front camera) 209, a rear camera (rear camera) 210, an ISP IC 205, a rear camera 211, a rear camera 212, a modem (modem) 213, a radio frequency (radio frequency, RF) IC 214, an antenna (antenna) 215, a low power memory (low power double data rate, LPDDR) 216, a universal flash storage (universal flash storage, UFS) 217, a touch panel (touch panel)/liquid crystal display (liquid crystal display, LCD) module 218, a fingerprint module (fingerprint module) 219, an audio codec (audio codec) 220, a sensor (sensor) 221, a motor (motor) 222, a speaker (speaker) 223, a microphone (MIC) 224, and a receiver (receiver) 225.

It should be noted that the ISP IC 205 and the rear camera 210 in this embodiment of this application may be integrated in a camera module. In this way, costs can be reduced, and an area of a main board can be reduced. It can be understood that some or all of the front camera 209, the rear camera 211, and the rear camera 212 may be respectively integrated with corresponding ISP ICs in their respective camera modules (not shown in the figure). A quantity of cameras and specific forms of the camera modules are not limited in this embodiment of this application.

It can be understood that the structure illustrated in this embodiment of this application does not constitute a specific limitation on the electronic device 200. In some other embodiments of this application, the electronic device 200 may include more or fewer components than those shown in the figure, a combination of some components, splitting of some components, or components in different arrangements. The components shown in the figure may be implemented by using hardware, software, or a combination of software and hardware.

The SOC 201 may be a processor, and the SOC 201 may include one or more processing units. For example, the SOC 201 may include an application processor (application processor, AP), a modem 213, a graphics processing unit (graphics processing unit, GPU), a controller, a video codec, a digital signal processor (digital signal processor, DSP), a baseband processor, and/or a neural-network processing unit (neural-network processing unit, NPU). Different processing units may be separate devices or may be integrated in one or more processors.

The SOC 201 may be provided with a controller. The controller may generate an operation control signal based on instruction operation code and a timing signal, to complete control of instruction fetching and execution.

The SOC 201 may be further provided with a memory configured to store instructions and data. In some embodiments, the memory in the SOC 201 is a cache. The memory may store instructions or data just used or repeatedly used by the SOC 201. If the SOC 201 needs to use the instructions or data again, the SOC 201 may directly invoke the instructions or data from the memory. This avoids repeated access and reduces waiting time of the SOC 201, thereby improving system efficiency.

In some embodiments, the SOC 201 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or the like.

The I2C interface is a bidirectional synchronous serial bus and includes a serial data line SDA and a serial clock line (serial clock line, SCL). In some embodiments, the SOC 201 may include a plurality of groups of I2C buses. The SOC 201 may be coupled to a touch sensor, a charger, a flash, a camera, and the like through different I2C bus interfaces. For example, the SOC 201 may be coupled to the touch sensor through the I2C interface, so that the SOC 201 communicates with the touch sensor through the I2C bus interface to implement a touch function of the electronic device 200.

The I2S interface may be configured to perform audio communication. In some embodiments, the SOC 201 may include a plurality of groups of I2S buses. The SOC 201 may be coupled to the audio codec 220 through an I2S bus to implement communication between the SOC 201 and the audio codec 220. In some embodiments, the audio codec 220 may transmit an audio signal to a wireless communication module through the I2S interface, so as to implement a function of answering calls through a Bluetooth earphone.

The PCM interface may also be configured to perform audio communication to sample, quantize, and encode an analog signal. In some embodiments, the audio codec 220 may be coupled to the wireless communication module through a PCM bus interface. In some embodiments, the audio codec 220 may alternatively transmit an audio signal to the wireless communication module through the PCM interface, so as to implement a function of answering calls through a Bluetooth earphone. Both the I2S interface and the PCM interface may be configured to perform audio communication.

The UART interface is a universal serial data bus and is configured to perform asynchronous communication. The bus may be a bidirectional communication bus that converts to-be-transmitted data between serial communication and parallel communication. In some embodiments, the UART interface is usually configured to connect the SOC 201 and the wireless communication module. For example, the SOC 201 communicates with a Bluetooth module of the wireless communication module through the UART interface to implement a Bluetooth function. In some embodiments, the audio codec 220 may transmit an audio signal to the wireless communication module through the UART interface, so as to implement a function of playing music by using a Bluetooth earphone.

The MIPI interface may be configured to connect the SOC 201 to a peripheral device such as a display and a camera. The MIPI interface includes a camera serial interface (camera serial interface, CSI), a display serial interface (display serial interface, DSI), and the like. In some embodiments, the SOC 201 communicates with the camera through the CSI interface to implement a shooting function of the electronic device 200. The SOC 201 communicates with the display through the DSI interface to implement a display function of the electronic device 200.

The GPIO interface may be configured by using software. The GPIO interface may be configured as a control signal interface or a data signal interface. In some embodiments, the GPIO interface may be configured to connect the SOC 201 to the camera, the display, the wireless communication module, the audio codec 220, the sensor, and the like. The GPIO interface may alternatively be configured as an I2C interface, an I2S interface, a UART interface, an MIPI interface, or the like.

It can be understood that an interface connection relationship between the modules illustrated in this embodiment of this application is merely used as an example for description, and does not constitute any limitation on the structure of the electronic device 200. In some other embodiments of this application, the electronic device 200 may alternatively use an interface connection manner different from that in the foregoing embodiments or a combination of a plurality of interface connection manners.

The master PMU 202 and the slave PMU 208 each may be referred to as a power management module. A PMU in this embodiment of this application may be the master PMU 202 or the slave PMU 208. This is not specifically limited in this embodiment of this application. For ease of description, in this embodiment of this application, a description is provided by using an example in which the PMU is the master PMU 202.

The master PMU 202 may be connected to the power on button 206, the charging chip 203, and the SOC 201. The master PMU 202 is configured to receive an input from the battery 207 and/or the charging chip 203 to supply power to the SOC 201, an internal memory, the display, the camera, the wireless communication module, and the like. The master PMU 202 may be further configured to monitor parameters such as a battery capacity, a battery cycle count, and a battery health status (electric leakage or impedance). The master PMU 202 may be further configured to: during charging or when the power on button 206 is pressed, trigger the electronic device 200 to perform a power-on process or a system wake-up process. In some embodiments, the master PMU 202 may alternatively be disposed in the SOC 201. In some other embodiments, the master PMU 202 and the charging chip 203 may alternatively be disposed in a same device.

The charging chip 203 may also be referred to as a charging management module or a charger chip, and the charger chip includes, for example, a charger IC. The charging chip 203 is configured to receive a charge input from a charger (or referred to as an adapter). The charger may be a wireless charger or a wired charger. In some embodiments of wired charging, the charging chip 203 may receive a charge input from a wired charger through the USB connector 204. In some embodiments of wireless charging, the charging chip 203 may receive a wireless charge input by using a wireless charging coil of the electronic device. When charging the battery 207, the charging chip 203 may further supply power to the electronic device by using the master PMU 202.

The USB connector 204 is a connector that complies with the USB standard specification, and may specifically be a mini USB connector, a micro USB connector, a USB Type C connector, or the like. The USB connector may be configured to connect a charger to charge the electronic device 200, may be configured to transmit data between the electronic device 200 and a peripheral device, and may also be configured to connect an earphone to play audio by using the earphone. The connector may be further configured to connect another electronic device.

The power on button 206 may be a mechanical button or a touch button. The electronic device 200 may receive an input from the power on button to implement a power-on process or a system wake-up process.

The electronic device 200 may implement a shooting function by using the ISP IC 205, the camera, the video codec, the graphics processing unit (graphics processing unit, GPU), the display, the application processor, and the like. The camera may include the front camera 209 and three rear cameras 210 to 212, and any one of the cameras may be integrated with the ISP IC and the switch devices in a camera module. It can be understood that a quantity of cameras and specific forms of the cameras may be adjusted depending on actual application.

The ISP IC 205 is configured to process data obtained by the camera. For example, the ISP IC 205 may perform algorithm-based optimization on noise, brightness, and skin tune of an image. The ISP IC 205 may further optimize parameters such as exposure and color temperature of a shooting scene.

The camera is configured to capture a static image or a video. An optical image of an object is generated by using a lens and is projected to a photosensitive element. The photosensitive element may be a charge coupled device (charge coupled device, CCD) or a complementary metal-oxide semiconductor (complementary metal-oxide semiconductor, CMOS) phototransistor. The photosensitive element converts an optical signal into an electrical signal, and then the electronic device converts the electrical signal into a digital image signal. The DSP processes the digital image signal. For example, the DSP converts the digital image signal into an image signal in a standard format such as RGB or YUV. Further, the ISP IC 205 may further optimize the image signal processed by the DSP. In some embodiments, the electronic device 200 may include one or N cameras, where N is a positive integer greater than 1.

The digital signal processor is configured to process digital signals, including not only digital image signals but also other digital signals. For example, when the electronic device 200 selects a frequency, the digital signal processor is configured to perform Fourier transform and the like on energy of frequencies.

The video codec is configured to compress or decompress a digital video. The electronic device 200 may support one or more types of video codecs, so that the electronic device 200 can play or record videos in a plurality of coding formats such as moving picture experts group (moving picture experts group, MPEG)-1, MPEG-2, MPEG-3, and MPEG-4.

The neural-network processing unit (neural-network processing unit, NPU) is a neural-network (neural-network, NN) computing processor that quickly processes input information by emulating a biological neural network structure, for example, by emulating a mode of transfer between human-brain neurons, and may further perform self-learning constantly. With the NPU, the electronic device 200 can implement intelligent cognition and other applications such as image recognition, face recognition, voice recognition, and text understanding.

A wireless communication function of the electronic device 200 may be implemented by using the modem 213, the radio frequency chip 214, the antenna 215, the mobile communication module, the wireless communication module, the baseband processor, and the like.

The antenna 215 may transmit and receive electromagnetic wave signals based on the radio frequency chip 214. Each antenna in the electronic device 200 may be configured to cover one or more communication bands. Different antennas may be reused to improve antenna utilization. For example, the antenna 215 may be reused as a diversity antenna of a wireless local area network. In some other embodiments, the antenna may be used in combination with a tuning switch.

The mobile communication module may provide wireless communication solutions including 2G/3G/4G/5G and the like to be applied to the electronic device 200. The mobile communication module may include at least one filter, a switch, a power amplifier, a low noise amplifier (low noise amplifier, LNA), and the like. The mobile communication module may receive an electromagnetic wave by using an antenna 1, perform processing such as filtering and amplification on the received electromagnetic wave, and then transmit a processed electromagnetic wave to the modem 213 for demodulation. The mobile communication module may further amplify a signal modulated by the modem 213, and convert the amplified signal into an electromagnetic wave and radiate the electromagnetic wave by using the antenna 1. In some embodiments, at least some functional modules of the mobile communication module may be provided in the processor. In some embodiments, at least some functional modules of the mobile communication module and at least some modules of the processor may be provided in a same device.

The modem 213 may include a modulator and a demodulator. The modulator is configured to modulate a to-be-transmitted low frequency baseband signal into a medium or high frequency signal. The demodulator is configured to demodulate a received electromagnetic wave signal into a low frequency baseband signal. Then, the demodulator transmits the low frequency baseband signal obtained through demodulation to the baseband processor for processing. After the low frequency baseband signal is processed by the baseband processor, a processed low frequency baseband signal is transmitted to the application processor. The application processor outputs a sound signal by using an audio device (not limited to the speaker 223, the receiver 225, and the like), or displays an image or a video by using the display. In some embodiments, the modem 213 may be a separate device. In some other embodiments, the modem 213 may be separate from the processor and provided in a same device together with the mobile communication module or another function module.

The wireless communication module may provide wireless communication solutions applied to the electronic device 200 and including wireless local area network (wireless local area network, WLAN) (for example, wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), infrared (infrared, IR) technologies, and the like. The wireless communication module may be one or more devices integrating at least one communication processing module. The wireless communication module receives an electromagnetic wave by using an antenna, performs frequency modulation and filtering processing on an electromagnetic wave signal, and transmits a processed signal to the processor. The wireless communication module may also receive a to-be-transmitted signal from the processor, perform frequency modulation and amplification on the signal, and convert a processed signal into an electromagnetic wave and radiate the electromagnetic wave by using the antenna.

An external memory interface may be configured to connect to an external storage card, for example, a micro SD card, to expand a storage capacity of the electronic device 200. The external storage card communicates with the SOC 201 through the external memory interface to implement a data storage function. For example, files such as music and video files are stored in the external storage card.

The internal memory may be configured to store computer executable program code, where the executable program code includes instructions. The internal memory may include a program storage area and a data storage area. The program storage area may store an operating system, an application program required by at least one function (for example, a sound playing function and an image playing function). The data storage area may store data (for example, audio data and a phone book) created during use of the electronic device 200 and the like. In addition, the internal memory may include a high-speed random access memory, and may further include a non-volatile memory, for example, at least one magnetic disk storage device, a flash memory device, the LPDDR 216, and the UFS 217. By running the instructions stored in the internal memory and/or the instructions stored in the memory that is provided in the processor, the SOC 201 executes various functional applications and data processing of the electronic device 200.

The display is configured to display an image, a video, and the like. The display includes a display panel. The display panel may be the LCD module 218, an organic light-emitting diode (organic light-emitting diode, OLED), an active-matrix organic light-emitting diode (active-matrix organic light-emitting diode, AMOLED), a flex light-emitting diode (flex light-emitting diode, FLED), MiniLED, Micro LED, MicroOLED, a quantum dot light-emitting diode (quantum dot light-emitting diode, QLED), or the like. In some embodiments, the electronic device 200 may include one or N displays, where N is a positive integer greater than 1. The LCD module 218 may be a touchscreen, and a touch operation performed by a user may also be received based on the LCD module.

The fingerprint module 219 is configured to collect fingerprints. The electronic device 200 may implement fingerprint unlocking, application lock access, fingerprint-based shooting, fingerprint-based call answering, and the like by using characteristics of a collected fingerprint.

The electronic device 200 may use the audio codec 220, the speaker 223, the receiver 225, the microphone 224, the earphone jack, the application processor, and the like to implement an audio function such as music playing and sound recording.

The audio codec 220 is configured to convert digital audio information into an analog audio signal for output, and is also configured to convert an analog audio input into a digital audio signal. The audio codec 220 may be further configured to encode and decode audio signals. In some embodiments, the audio codec 220 may be provided in the SOC 201, or some functional modules of the audio codec 220 may be provided in the SOC 201.

The speaker 223, also referred to as a "loudspeaker", is configured to convert an audio electrical signal into a sound signal. The electronic device 200 may be used for listening to music or answering a hands-free call by using the speaker 170A.

The receiver 225, also referred to as an "earpiece", is configured to convert an audio electrical signal into a sound signal. When the electronic device 200 receives a call or voice message, the receiver 170B may be placed near a human ear for listening to a voice.

The microphone 224, also referred to as a "mic" or "mike", is configured to convert a sound signal into an electrical signal. When making a call or sending voice message, a user may input a sound signal into the microphone 224 by speaking close to the microphone 224. The electronic device 200 may be provided with at least one microphone 224. In some other embodiments, the electronic device 200 may be provided with two microphones 224 to implement a noise reduction function in addition to acquiring a sound signal. In some other embodiments, the electronic device 200 may alternatively be provided with three, four, or more microphones 224 to acquire sound signals, reduce noise, identify sound sources, implement directional recording, and the like.

The motor 222 may generate a vibration alert. The motor 222 may be configured to provide a vibration alert for an incoming call, and may also be configured to provide a vibration feedback for a touch. For example, touch operations performed on different applications (for example, shooting and audio playback) may correspond to different vibration feedback effects. For touch operations performed on different regions of the display, the motor 222 may also correspondingly provide different vibration feedback effects. Different application scenarios (for example, time reminder, information receiving, alarm clock, and gaming) may also correspond to different vibration feedback effects. In addition, touch vibration feedback effects can be user-defined.

The electronic device 200 may further include various sensors 221 (not shown in the figure) and the like. A specific structure of the electronic device 200 is not limited in this embodiment of this application.

The electronic device 200 in this embodiment of this application may further include switch devices SW 1 and SW 2 (not shown in the figure), and some or both of the SW 1 and the SW 2 are also disposed in the camera module. Details are not described again.

To sum up, in this embodiment of this application, the ISP IC is disposed in the camera module, and some or both of the SW 1 and the SW 2 are also disposed in the camera module. In this way, costs can be reduced, and an area of the main board can be reduced. In addition, the ISP IC and the switch devices can be integrated in the camera module to implement decoupling between the camera module and the main board. In this way, the camera module can be applied to a universal main board, and main boards of a same type can be compatible with an ordinary camera module and a camera module with a preprocessing chip switching path, thereby improving universality of the main board.

A possible implementation of a structure in which a camera module is connected to a main board in an embodiment of this application is described in detail below with reference to FIG. 3 to FIG. 7.

Figure 3:
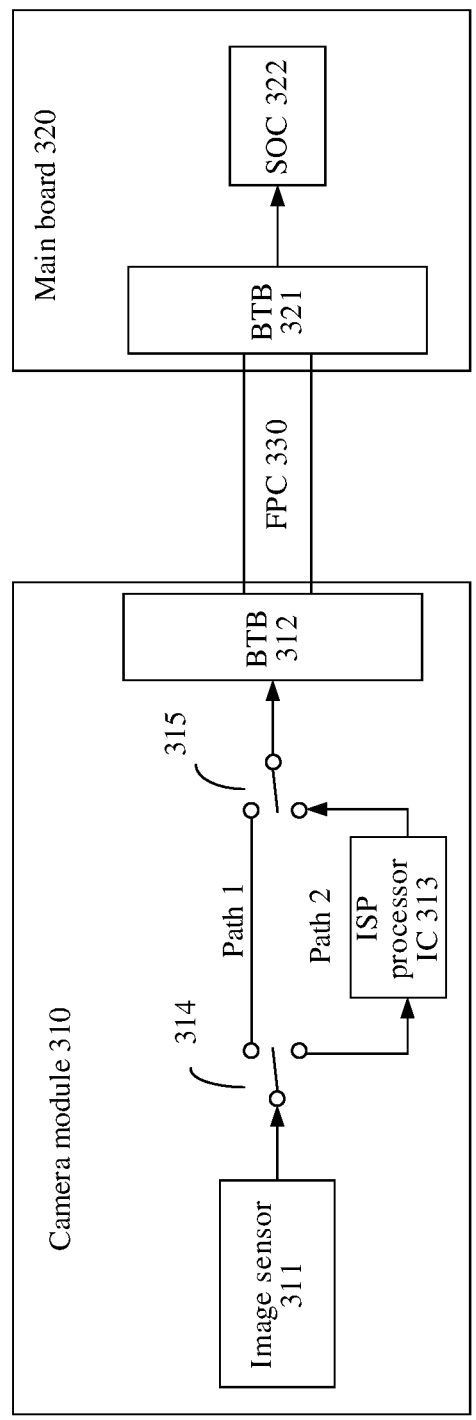
FIG. 3 is a schematic diagram of a structure in which a camera module is connected to a main board according to an embodiment of this application.

For example, FIG. 3 is a schematic diagram of a structure in which a camera module is connected to a main board according to an embodiment of this application.

As shown in FIG. 3, the camera module 310 is connected to the main board 320 via an FPC 330. The camera module 310 includes an image sensor 311, a BTB 312, an ISP IC 313, a first switch 314, and a second switch 315. The main board 320 includes a BTB 321 and an SOC 322.

Two ends of the FPC 330 may be respectively inserted into the BTB 312 and the BTB 321 to implement a connection between the camera module 310 and the main board 320. It can be understood that, because the FPC has advantages such as good flexibility and small occupancy space, in this embodiment of this application, an example in which the connection between the camera module 310 and the main board 320 is implemented via the FPC 330, the BTB 312, and the BTB 321 is used for description. In a possible implementation, the camera module 310 may be electrically connected to the main board 320 in any other manners. This is not specifically limited in this embodiment of this application.

Based on selection of the first switch 314 and the second switch 315, image or video data acquired by the image sensor 311 may be transmitted from the FPC 330 to the SOC 322 through a path 1, or the image or video data acquired by the image sensor 311 may be processed by the ISP IC 313 in a path 2, and then processed image or video data may be transmitted from the FPC 330 to the SOC 322. The ISP IC 313 may be a separate chip, or may be integrated in the image sensor 311. A specific implementation of the ISP IC 313 is not limited in this application.

For example, if an electronic device performs image preview, video recording without beautification, or other steps, the electronic device may control the first switch 314 and the second switch 315 to enable the path 1 to be connected, so that the image or video data acquired by the image sensor 311 is transmitted from the FPC 330 to the SOC 322 through the path 1. If the electronic device performs shooting, video recording with beautification, or other steps, the electronic device may control the first switch 314 and the second switch 315 to enable the path 2 to be connected, so that the image or video data acquired by the image sensor 311 is processed by using the ISP IC 313 in the path 2, and then processed image or video data is transmitted from the FPC 330 to the SOC 322.

In this embodiment of this application, the first switch 314 and the second switch 315 in the camera module 310 each are configured to implement a single pole double throw switch function. A single pole double throw switch may include one movable terminal and two fixed terminals, and connections between the movable terminal and the two fixed terminals may be switched. The first switch 314 is used as an example. One end that is of the first switch 314 and that is connected to the image sensor 311 is a movable terminal, and ends that are of the first switch 314 and that are connected to the path 1 and the path 2 are fixed terminals.

Both the first switch 314 and the second switch 315 may be separate chips. The first switch 314 and/or the second switch 315 may alternatively be integrated in the image sensor 311. In this way, a size of the camera module 310 may be reduced through integration. The first switch 314 and/or the second switch 315 may alternatively be implemented by a circuit constructed by electrical devices. For example, specific devices of the first switch 314 and the second switch 315 include but are not limited to the following several devices: a single metal-oxide-semiconductor field-effect transistor (metal-oxide-semiconductor field-effect transistor, MOSFET), a plurality of MOSFETs that jointly implement a single pole double throw switch function, and a circuit that is constructed by using an integrated circuit and that implements a switch function. The MOSFET may be an N-type field-effect transistor (negative channel MOS, NMOS) or a P-type field-effect transistor (positive channel MOS, NMOS). A specific implementation of the first switch 314 and the second switch 315 is not limited in this embodiment of this application.

It should be noted that, in the embodiment corresponding to FIG. 3, the SOC 322 may receive, via one interface, data transmitted through the path 1 or data transmitted through the path 2. By using the first switch 314 and the second switch 315, the path 1 and the path 2 can be used at different time points. In addition, when the path 2 is used for data transmission, both ends of the path 1 are disconnected from a circuit to avoid radiation caused because either end of the path 1 is connected to the circuit. Similarly, when the path 1 is used to transmit data, both ends of the path 2 are disconnected from the circuit, to avoid a radiation phenomenon caused because any end of the path 2 is connected to the circuit.

In a possible implementation, the second switch 315 may be omitted. However, when the second switch 315 is omitted, and the path 2 is selected for data transmission, a right end of the path 1 is connected to the SOC 322. As a result, one end of the path 1 floats and the other end of the path 1 is connected to the circuit, and a state similar to an antenna occurs, resulting in radiation and interference to data transmitted through the path 2.

Figure 4:
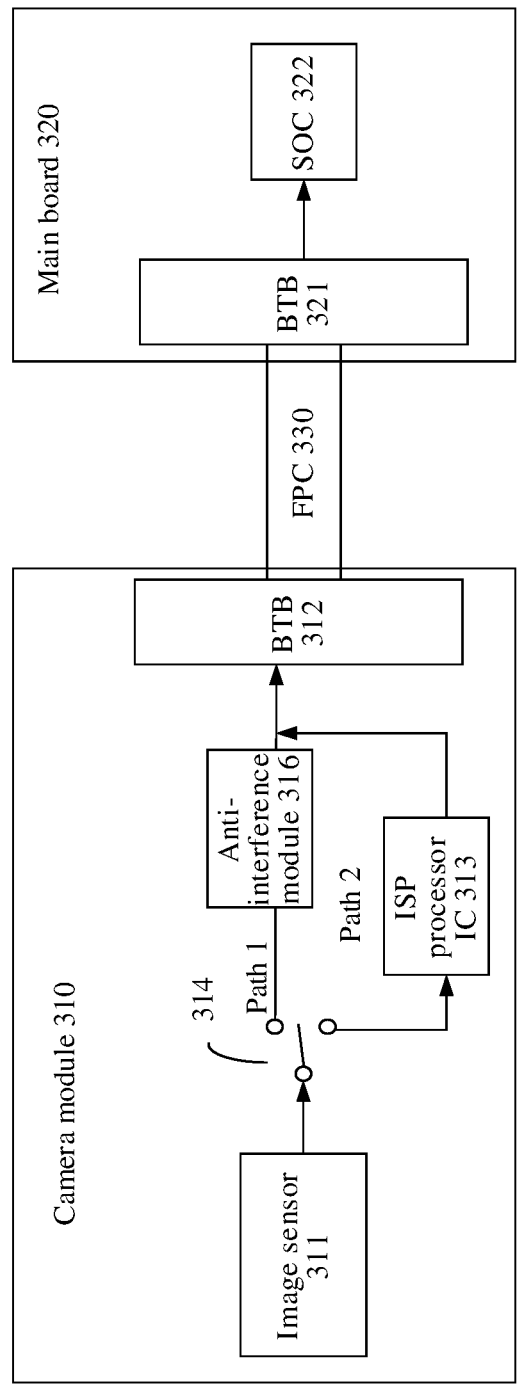
FIG. 4 is a schematic diagram of a structure in which a camera module is connected to a main board according to an embodiment of this application.

Therefore, in another alternative solution, as shown in FIG. 4, an anti-interference module 316 may be provided in the path 1. Interference caused when the path 1 is not used may be suppressed by using the anti-interference module 316, so that the second switch 315 can be omitted. It can be understood that an anti-interference module (not shown in the figure) may also be provided in the path 2 in FIG. 4 to suppress interference caused when the path 2 is not used. The anti-interference module may include a device such as a resistor or a capacitor. This is not limited in this embodiment of this application. Costs of the anti-interference module may be lower than those of the second switch 315. In the manner in FIG. 4, costs can be further reduced.

Figure 5:
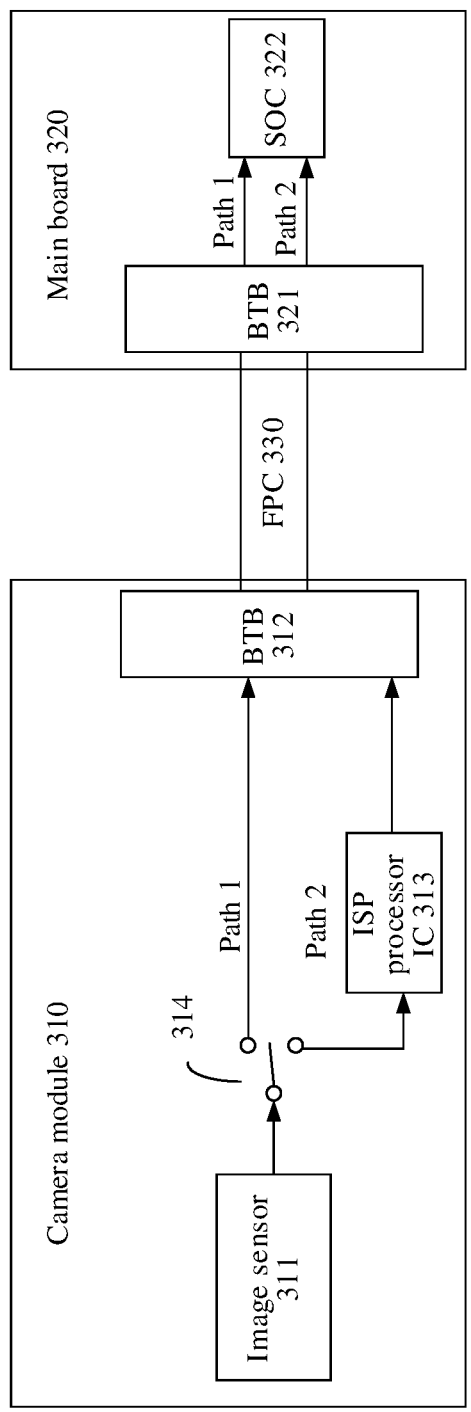
FIG. 5 is a schematic diagram of a structure in which a camera module is connected to a main board according to an embodiment of this application.

In still another alternative solution, as shown in FIG. 5, after the second switch 315 is omitted, data in the path 1 and the path 2 may be transmitted to the SOC 322 through two routes. Adaptively, in the SOC 322, data transmitted through the path 1 or data transmitted through the path 2 may be respectively received through two interfaces. Logic of disconnecting an interface from a circuit and connecting the interface to the circuit may be controlled in the SOC 322. Therefore, by using the SOC 322, when the path 2 is used for data transmission, both ends of the path 1 can be disconnected from the circuit to avoid radiation caused because either end of the path 1 is connected to the circuit. Similarly, when the path 1 is used to transmit data, both ends of the path 2 are disconnected from the circuit, to avoid a radiation phenomenon caused because any end of the path 2 is connected to the circuit.

In yet another alternative solution, the second switch may be disposed on the main board. For example, FIG. 6 is a schematic diagram of a structure in which another camera module is connected to a main board according to an embodiment of this application.

Figure 6:
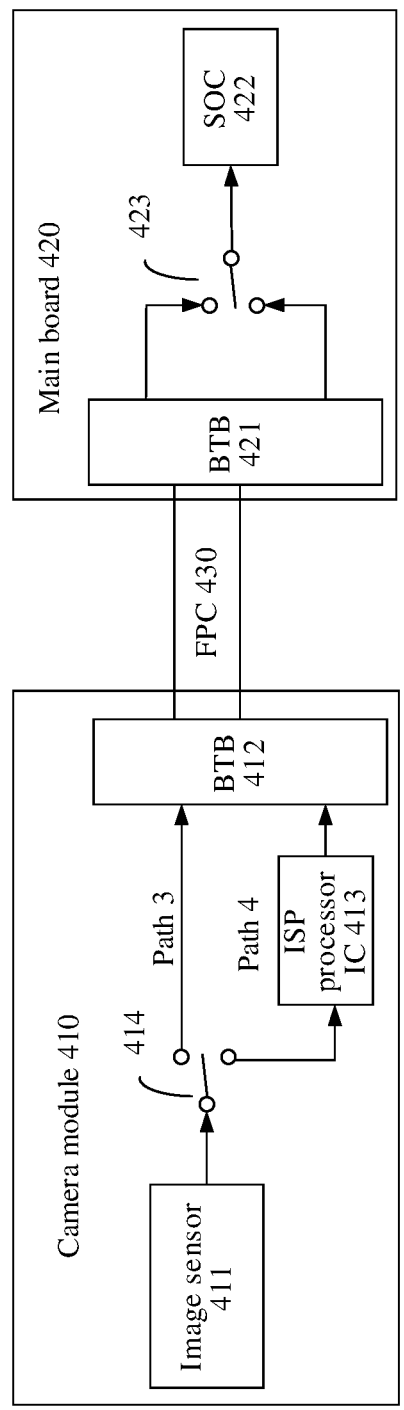
FIG. 6 is a schematic diagram of a structure in which a camera module is connected to a main board according to an embodiment of this application.

As shown in FIG. 6, the camera module 410 is connected to the main board 420 via an FPC 430. The camera module 410 includes an image sensor 411, a BTB 412, an ISP IC 413, and a fourth switch 414. The main board 420 includes a BTB 421, an SOC 422, and a third switch 423.

Two ends of the FPC 430 may be respectively inserted into the BTB 412 and the BTB 421 to implement a connection between the camera module 410 and the main board 420.

Based on selection of the fourth switch 414, image or video data acquired by the image sensor 411 may be transmitted from the FPC 430 to the main board 420 through a path 3, and then transmitted to the SOC 422 through one path of the third switch 423. Based on selection of the fourth switch 414, alternatively, image or video data acquired by the image sensor 411 may be processed by the ISP IC 413 in a path 4, and processed image or video data may be transmitted from the FPC 430 to the main board 420 and then transmitted to the SOC 422 through the other path of the third switch 423. The ISP IC 413 may be a separate chip, or may be integrated in the image sensor 411. A specific implementation of the ISP IC 413 is not limited in this application.

For example, if an electronic device performs image preview, video recording without beautification, or other steps, the electronic device may control the fourth switch 414 to enable the path 3 to be connected, so that the image or video data acquired by the image sensor 411 is transmitted from the FPC 430 and one path of the third switch 423 to the SOC 422 through the path 3. If the electronic device performs shooting, video recording with beautification, or other steps, the electronic device may control the fourth switch 414 to enable the path 4 to be connected, so that the image or video data acquired by the image sensor 411 is processed by using the ISP IC 413 in the path 4, and then processed image or video data is transmitted from the FPC 430 and the other path of the third switch 423 to the SOC 422.

In this embodiment of this application, the fourth switch 414 and the third switch 423 in the camera module 410 each are configured to implement a single pole double throw switch function. Both the fourth switch 414 and the third switch 423 may be separate chips.

In a possible implementation, the fourth switch 414 may be integrated in the image sensor 411. In this way, a size of the camera module 410 may be reduced through integration. The third switch 423 may be integrated in the SOC 422. In this way, a size of the SOC 422 may be reduced through integration.

It should be noted that, by using the third switch 423 and the fourth switch 414, the path 3 and the path 4 can be used at different time points. In addition, when the path 4 is used for data transmission, both ends of the path 3 are disconnected from a circuit to avoid radiation caused because either end of the path 3 is connected to the circuit. Similarly, when the path 3 is used to transmit data, both ends of the path 4 are disconnected from the circuit, to avoid a radiation phenomenon caused because any end of the path 4 is connected to the circuit.

Figure 7:
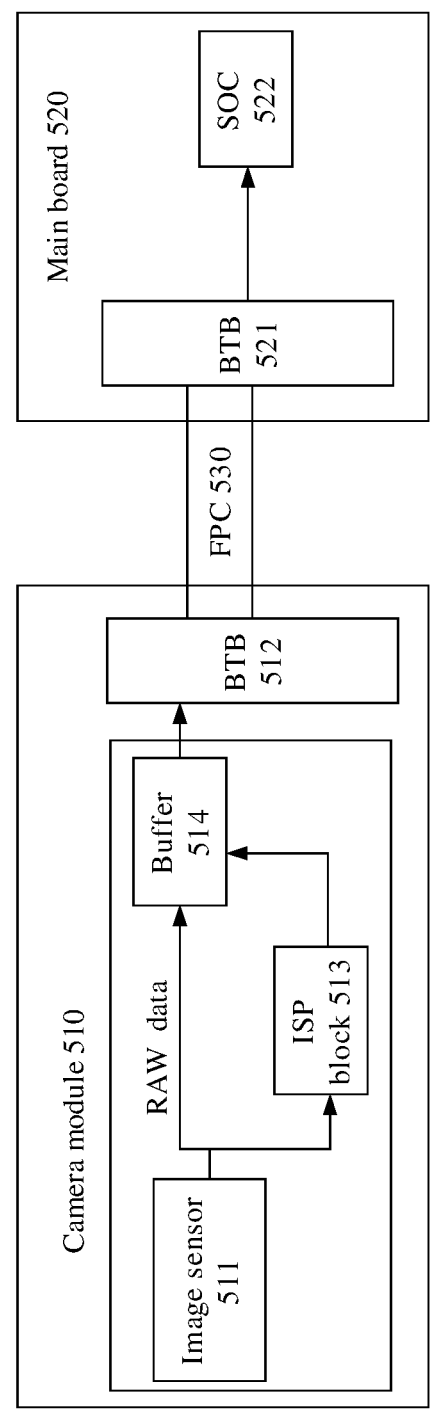
FIG. 7 is a schematic diagram of a structure in which a camera module is connected to a main board according to an embodiment of this application.

For example, FIG. 7 is a schematic diagram of a structure in which a camera module is connected to a main board when a third switch and an ISP IC are integrated in an image sensor and a fourth switch is integrated in an SOC.

As shown in FIG. 7, the camera module 510 is connected to the main board 520 via an FPC 530. The camera module 510 includes the image sensor 511, a BTB 512, an ISP block (block) 513, and a buffer (buffer) 514. The main board 520 includes a BTB 521 and an SOC 522.

It should be noted that the image sensor 511, the BTB 512, the ISP block 513, and the buffer 514 may be integrated together. In a possible implementation, integrated devices may also be collectively referred to as an image sensor or a camera. This is not specifically limited in this embodiment of this application.

Two ends of the FPC 530 may be respectively inserted into the BTB 512 and the BTB 521 to implement a connection between the camera module 510 and the main board 520.

Image or video data acquired by the image sensor 511 may be stored in the buffer 514 in a RAW format and transmitted from the FPC 530 to the SOC 522 of the main board 520. Alternatively, the image or video data acquired by the image sensor 511 may be processed by the ISP, and processed image or video data may be stored in the buffer 514 and transmitted from the FPC 530 to the SOC 522 of the main board 520.

It should be noted that, in this embodiment of this application, the switch devices are respectively integrated in the image sensor 511 and the SOC 522, and therefore the switch devices are not shown in FIG. 7. However, processing logic of the data acquired by the image sensor 511 in FIG. 7 is still similar to that in FIG. 6, and whether the data is processed by the ISP may be selected depending on different scenarios. Details are not described herein again.

Figure 8:
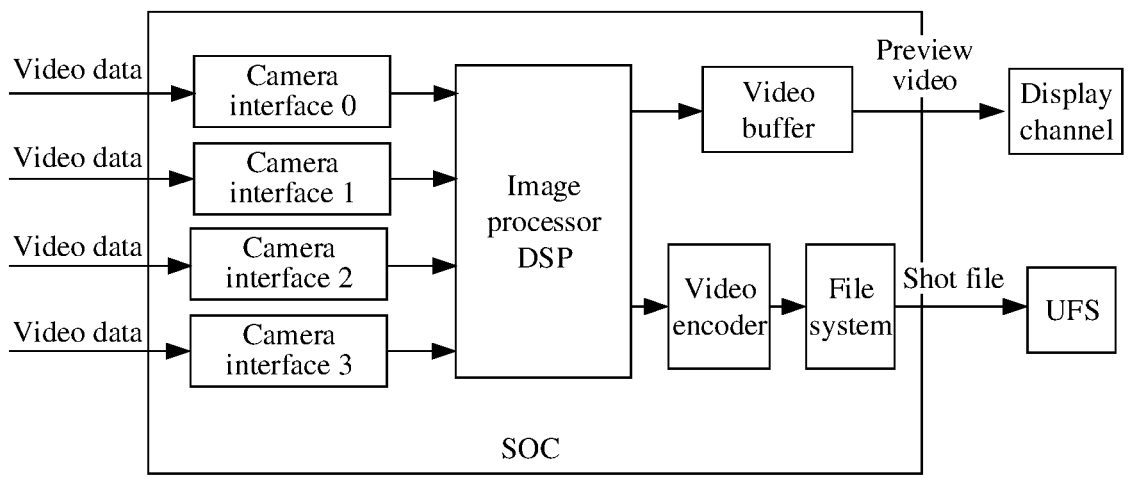
FIG. 8 is a schematic diagram of a structure of an SOC according to an embodiment of this application.

The following further describes an image processing process of an electronic device in the embodiments of this application with reference to FIG. 8.

FIG. 8 is a schematic diagram of an internal structure of an SOC of an electronic device.

The SOC may include a camera interface (camera interface) o to a camera interface 3, an image processor (image processor) DSP, a video buffer (video buffer), a video encoder (video codec), and a file system (file system).

The camera interface o to the camera interface 3 are configured to connect camera modules. It can be understood that, in this embodiment of this application, a description is provided by using an example in which the electronic device includes four camera modules. Therefore, there are four camera interfaces. In a possible implementation, the electronic device may include N camera modules. In this case, a quantity of camera interfaces may also be N. N is a natural number.

Video data acquired by each camera may be transmitted to the DSP through a camera interface for processing, and processed data may be output in two paths. In one path, the processed data may be configured in the video buffer to form a preview video that can be displayed in a display channel (display panel). It can be understood that the processed data in this path may be data that has not been processed by the ISP and that is in the path 1, the path 3 or the like in the foregoing embodiments. In the other path, the processed data may be processed by the video encoder and the file system to form a shot file to be stored in a UFS. The processed data in this path may be data that has been processed by the ISP and that is in the path 2, the path 4, or the like in the foregoing embodiments.

It should be noted that, in this embodiment of this application, connection manners between camera modules in the electronic device and the SOC may be different. Alternatively, it can be understood that the electronic device may include any one or more connection manners shown in FIG. 1 and FIG. 3 to FIG. 7.

For example, with reference to FIG. 2, a connection manner between the SOC and a camera module in which the front camera 209 in the electronic device 200 is located may be the connection manner shown in FIG. 1. Adaptively, for devices included in the SOC and the camera module in which the front camera 209 in the electronic device 200 is located, refer to the description about FIG. 1. A connection manner between the SOC and a camera module in which the rear camera 210 in the electronic device 200 is located may be the connection manner shown in FIG. 3. Adaptively, for devices included in the SOC and the camera module in which the rear camera 210 in the electronic device 200 is located, refer to the description about FIG. 3. A connection manner between the SOC and a camera module in which the rear camera 211 in the electronic device 200 is located may be the connection manner shown in FIG. 4. Adaptively, for devices included in the SOC and the camera module in which the rear camera 211 in the electronic device 200 is located, refer to the description about FIG. 4. A connection manner between the SOC and a camera module in which the rear camera 212 in the electronic device 200 is located may be the connection manner shown in FIG. 5. Adaptively, for devices included in the SOC and the camera module in which the rear camera 212 in the electronic device 200 is located, refer to the description about FIG. 5.

Certainly, a specific connection relationship between the SOC and a camera module in which each camera in the electronic device 200 is located may be any connection manner shown in FIG. 1, FIG. 3, FIG. 4, FIG. 5, FIG. 6, and FIG. 7. Connection relationships between any two or more camera modules and the SOC may be the same or different. This is not specifically limited in this embodiment of this application.

To sum up, in this embodiment of this application, the ISP IC is disposed in the camera module, and some or all of the switch devices are also disposed in the camera module. In this way, costs can be reduced, and an area of the main board can be reduced. In addition, the ISP IC and the switch devices can be integrated in the camera module to implement decoupling between the camera module and the main board. In this way, the camera module can be applied to a universal main board, and main boards of a same type can be compatible with an ordinary camera module and a camera module with a preprocessing chip switching path, thereby improving universality of the main board.

The electronic device in this embodiment of this application may be a device that can process various image data signals, for example, a handheld device or a vehicle-mounted device with a wireless connection function. Currently, some examples of the terminal include a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device and a computing device with a wireless communication function, another processing device, a vehicle-mounted device, or a wearable device connected to a wireless modem, an electronic device in a 5G network, or an electronic device in a future evolved public land mobile communication network (public land mobile network, PLMN). This is not limited in this embodiment of this application.

By way of example and not limitation, in this embodiment of this application, the electronic device may alternatively be a wearable device. The wearable device may also be referred to as a wearable smart device and is a general term of wearable devices that are developed through intelligent design of daily wear by using a wearable technology, for example, glasses, gloves, watches, clothing, and shoes. The wearable device is a portable device that is worn directly on a body or integrated into clothing or accessories of a user. The wearable device is not only a type of hardware device, but also achieves a powerful function through software support, data exchange, and cloud interaction. Generalized wearable smart devices include devices that have full functions and large sizes and that implement complete or partial functions without relying on a smart phone, for example, smart watches or smart glasses; and include devices that are focused only on one type of application function and that need to be used in cooperation with another device such as a smart phone, for example, various smart bands and smart jewelry for physical sign monitoring.

In addition, in this embodiment of this application, the electronic device may alternatively be an electronic device in an internet of things (internet of things, IoT) system. The IoT is an important part of future information technology development. A main technical feature of the IoT is to connect an object to a network by using a communication technology, so as to implement an intelligent network with a man-machine interconnection and an object interconnection.

In this embodiment of this application, the electronic device may also be referred to as user equipment (user equipment, UE), a mobile station (mobile station, MS), a mobile terminal (mobile terminal, MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

In this embodiment of this application, the electronic device or each network device includes a hardware layer, an operating system layer running over the hardware layer, and an application layer running over the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing through a process (process), for example, a Linux operating system, a Unix operating system, an Android operating system, an IOS operating system, or a windows operating system. The application layer includes applications such as a browser, an address book, word processing software, and instant messaging software.

Figure 9:
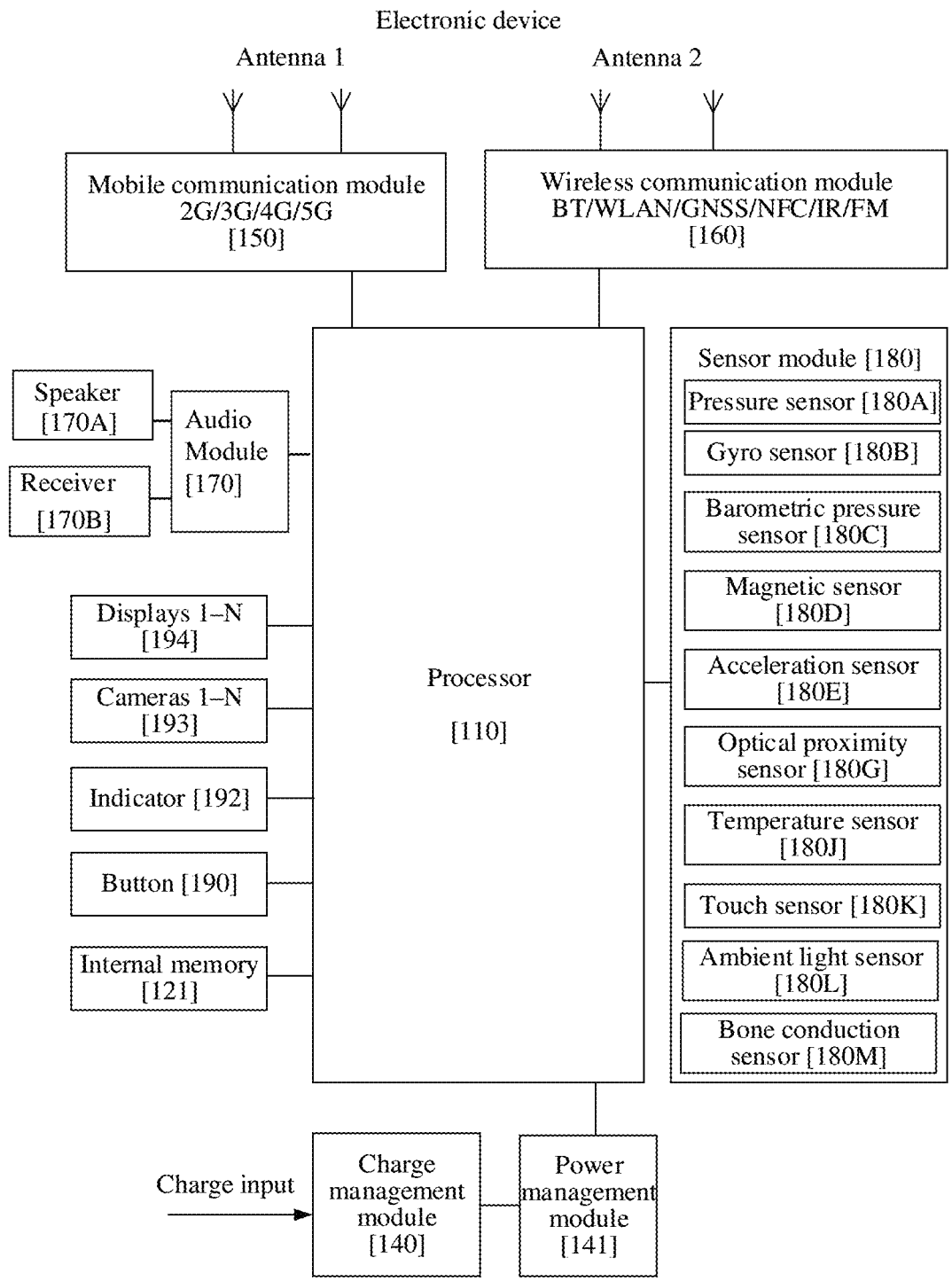
FIG. 9 is a schematic diagram of a structure of an electronic device according to an embodiment of this application.

For example, FIG. 9 is a schematic diagram of a structure of a specific electronic device.

The electronic device may include a processor 110, an internal memory 121, a universal serial bus (universal serial bus, USB) connector, a charge management module 140, a power management module 141, an antenna 1, an antenna 2, a mobile communication module 150, a wireless communication module 160, an audio module 170, a speaker 170A, a receiver 170B, a sensor module 180, a button 190, an indicator 192, a camera 193, a display 194, and the like. The sensor module 180 may include a pressure sensor 180A, a gyro sensor 180B, a barometric pressure sensor 180C, a magnetic sensor 180D, an acceleration sensor 180E, an inductance sensor 180F, an optical proximity sensor 180G, a temperature sensor 180J, a touch sensor 180K, an ambient light sensor 180L, a bone conduction sensor 180M, and the like.

It can be understood that the structure illustrated in this embodiment of this application does not constitute a specific limitation on the electronic device. In some other embodiments of this application, the electronic device may include more or fewer components than those shown in the figure, a combination of some components, splitting of some components, or components in different arrangements. The components shown in the figure may be implemented by using hardware, software, or a combination of software and hardware.

The processor 110 may include one or more processing units. Different processing units may be separate devices or may be integrated in one or more processors. A memory may be further provided in the processor 110 for storing instructions and data.

The charge management module 140 is configured to receive a charge input from a charger. The charger may be a wireless charger or a wired charger. The power management module 141 is configured to connect the charge management module 140 and the processor 110.

A wireless communication function of the electronic device may be implemented by using the antenna 1, the antenna 2, the mobile communication module 150, the wireless communication module 160, a modem processor, a baseband processor, and the like.

The antenna 1 and the antenna 2 are configured to transmit and receive electromagnetic wave signals. The antennas in the electronic device may be configured to cover one or more communication bands. Different antennas may be reused to improve antenna utilization.

The mobile communication module 150 may provide wireless communication solutions including 2G/3G/4G/5G and the like to be applied to the electronic device. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transmit a processed electromagnetic wave to the modem processor for demodulation.

The wireless communication module 160 may provide wireless communication solutions to be applied to the electronic device.

The electronic device may implement a display function by using a GPU, the display 194, an application processor, and the like. The GPU is a microprocessor for image processing, and is connected to the display 194 and the application processor. The GPU is configured to perform mathematical and geometric computation for graphics rendering.

The display 194 is configured to display an image, a video, and the like. The display 194 includes a display panel. In some embodiments, the electronic device may include one or N displays 194, where N is a positive integer greater than 1.

The electronic device may implement a shooting function by using the ISP, the camera 193, the video codec, the GPU, the display 194, the application processor, and the like.

The camera 193 is configured to capture a static image or a video. In some embodiments, the electronic device may include one or N cameras 193, where N is a positive integer greater than 1.

The internal memory 121 may be configured to store computer executable program code, where the executable program code includes instructions. The internal memory 121 may include a program storage area and a data storage area.

The electronic device may use the audio module 170, the speaker 170A, the receiver 170B, the application processor, and the like to implement an audio function such as music playing and sound recording.

It should be noted that, for the structural part of the electronic device in FIG. 9, reference may be made to the description in the embodiment corresponding to FIG. 2. Details are not described herein again.

The above embodiments, schematic structural diagrams, or schematic simulation diagrams are only used as examples to describe the technical solutions of this application, and a size ratio therein does not constitute any limitation on the protection scope of the technical solutions. Any modifications, equivalent replacements, improvements, and the like made within the spirit and principle of the above embodiments shall fall within the protection scope of the technical solutions.

What is claimed is:

1. An electronic device, comprising a main board and a camera module, wherein:
    the camera module comprises a camera, an image signal processor integrated circuit, a first switch, and a second switch, and the main board comprises a processor;
    the camera is configured to acquire image data;
    the image signal processor integrated circuit is configured to process the image data acquired by the camera;
    the first switch implements a single pole double throw function and is configured to implement switching of the camera to a first path or a second path, wherein the first path is a path through which the image data acquired by the camera is transmitted to the processor, and the second path is a path through which the image data acquired by the camera is processed by the image signal processor integrated circuit and processed image data is transmitted to the processor;

the processor is configured to process the data from the first path or the data from the second path;

the second switch implements a single pole double throw function and is configured to implement switching of the processor to the first path or the second path in the camera module;

a movable terminal of the first switch is connected to the camera, a first fixed terminal of the first switch is connected to a first end of the first path, and a second fixed terminal of the first switch is connected to a first end of the second path;

a movable terminal of the second switch is connected to the processor, a first fixed terminal of the second switch is connected to a second end of the first path, and a second fixed terminal of the second switch is connected to a second end of the second path; and the first switch and the second switch are configured to:
establish continuity of the first path in a circuit and break continuity of the second path in the circuit when the image data acquired by the camera is to be transmitted through the first path; or
establish continuity of the second path in the circuit and break continuity of the first path in the circuit when the image data acquired by the camera is to be transmitted through the second path.

2. The electronic device according to claim 1, wherein the processor receives the data from the first path and the data from the second path through a same interface.

3. The electronic device according to claim 1, wherein the camera module is disposed in the electronic device, and a metal shield is provided around the camera module.

4. The electronic device according to claim 1, wherein the camera module is connected to the main board via a flexible printed circuit (FPC), a board-to-board connector (BTB) is comprised in each of the camera module and the main board, and each BTB is configured to connect to the FPC.

5. The camera module according to claim 1, further comprising a board-to-board connector.

6. The electronic device according to claim 1, wherein the first switch and the second switch are separate chips.

7. The electronic device according to claim 1, wherein the first switch and the second switch are integrated in an image sensor.

8. The electronic device according to claim 1, wherein the camera module further comprises a board-to-board connector.

9. A camera module, wherein the camera module comprises a camera, an image signal processor integrated circuit, a first switch, and a second switch, and wherein:

the camera is configured to acquire image data;
the image signal processor integrated circuit is configured to process the image data acquired by the camera; and
the first switch implements a single pole double throw function and is configured to implement switching of the camera to a first path or a second path, wherein the first path is a path through which the image data acquired by the camera is transmitted to a processor in a main board, and the second path is a path through which the image data acquired by the camera is processed by the image signal processor integrated circuit and processed image data is transmitted to the processor;

the second switch implements a single pole double throw function and is configured to implement switching of the processor to the first path or the second path in the camera module;

a movable terminal of the first switch is connected to the camera, a first fixed terminal of the first switch is connected to a first end of the first path, and a second fixed terminal of the first switch is connected to a first end of the second path;

a movable terminal of the second switch is connected to the processor, a first fixed terminal of the second switch is connected to a second end of the first path, and a second fixed terminal of the second switch is connected to a second end of the second path; and the first switch and the second switch are configured to:
establish continuity of the first path in a circuit and break continuity of the second path in the circuit when the image data acquired by the camera is to be transmitted through the first path; or
establish continuity of the second path in the circuit and break continuity of the first path in the circuit when the image data acquired by the camera is to be transmitted through the second path.

10. The camera module according to claim 9, wherein the camera module is disposed in an electronic device, and a metal shield is provided around the camera module.

11. The camera module according to claim 9, wherein the first switch and the second switch are separate chips.

12. The camera module according to claim 9, wherein the first switch and the second switch are integrated in an image sensor.

13. An electronic device, comprising:
a main board comprising a processor; and
a camera module, comprising a camera, an image signal processor integrated circuit, and a first switch;
wherein the camera is configured to acquire image data;
wherein the image signal processor integrated circuit is configured to process the image data acquired by the camera;
wherein the first switch implements a single pole double throw function and is configured to implement switching of the camera to a first path or a second path, wherein the first path is a path through which the image data acquired by the camera is transmitted to the processor, and the second path is a path through which the image data acquired by the camera is processed by the image signal processor integrated circuit and processed image data is transmitted to the processor;
wherein the processor is configured to process the data from the first path or the data from the second path;
wherein the main board further comprises a third switch;
wherein the third switch implements a single pole double throw function and is configured to implement switching of the processor to the first path or the second path in the main board;
wherein a movable terminal of the first switch is connected to the camera, a first fixed terminal of the first switch is connected to a first end of the first path, and a second fixed terminal of the first switch is connected to a first end of the second path;
wherein both the first path and the second path are connected to the main board through respective routes;
wherein a movable terminal of the third switch is connected to the processor, a first fixed terminal of the third switch is connected to a first end that is of the first path and that is in the main board, and a second fixed terminal of the third switch is connected to a first end that is of the second path and that is in the main board; and the first switch and the third switch are configured to:
   establish continuity of the first path in a circuit and break continuity of the second path in the circuit when the image data acquired by the camera is to be transmitted through the first path; or
   establish continuity of the second path in the circuit and break continuity of the first path in the circuit when the image data acquired by the camera is to be transmitted through the second path.

14. The electronic device according to claim 13, wherein the processor receives the data from the first path and the data from the second path through a same interface.

15. The electronic device according to claim 13, wherein the camera module is disposed in the electronic device, and a metal shield is provided around the camera module.

16. The electronic device according to claim 13, wherein the camera module is connected to the main board via a flexible printed circuit (FPC), a board-to-board connector (BTB) is comprised in each of the camera module and the main board, and each BTB is configured to connect to the FPC.

17. The electronic device according to claim 13, wherein the image signal processor integrated circuit is integrated into an image sensor of the camera.

18. The electronic device according to claim 13, wherein the image signal processor integrated circuit is comprised in a separate chip from an image sensor of the camera.

19. The electronic device according to claim 13, wherein the third switch is integrated into a same chip as the processor.

20. The electronic device according to claim 13, wherein the third switch is a separate chip.

* * * * *